United States Patent
Ahsan et al.

(10) Patent No.: US 12,478,788 B2
(45) Date of Patent: Nov. 25, 2025

(54) MINIMALLY INVASIVE DEEP BRAIN STIMULATION USING ELECTROMAGNETIC WAVES

(71) Applicant: William Marsh Rice University, Houston, TX (US)

(72) Inventors: Fatima Ahsan, Houston, TX (US);
Taiyun Chi, Houston, TX (US);
Raymond Cho, Houston, TX (US);
Sameer A. Sheth, Houston, TX (US);
Wayne Goodman, Houston, TX (US);
Behnaam Aazhang, Houston, TX (US)

(73) Assignees: William Marsh Rice University, Houston, TX (US); Baylor College of Medicine, Houston, TX (US)

( * ) Notice: Subject to any disclaimer, the term of this patent is extended or adjusted under 35 U.S.C. 154(b) by 346 days.

(21) Appl. No.: 18/051,778

(22) Filed: Nov. 1, 2022

(65) Prior Publication Data
US 2023/0158314 A1    May 25, 2023

Related U.S. Application Data

(60) Provisional application No. 63/274,401, filed on Nov. 1, 2021.

(51) Int. Cl.
*A61N 1/375*    (2006.01)

(52) U.S. Cl.
CPC ............................. *A61N 1/37514* (2017.08)

(58) Field of Classification Search
None
See application file for complete search history.

(56) References Cited

U.S. PATENT DOCUMENTS

| | | | |
|---|---|---|---|
| 8,948,875 B2 * | 2/2015 | Paulus | A61N 1/36025 607/45 |
| 2011/0046694 A1 * | 2/2011 | Forsell | A61N 5/0622 607/45 |
| 2017/0120041 A1 * | 5/2017 | Wenger | A61B 5/24 |
| 2017/0216594 A1 * | 8/2017 | Grossman | A61N 1/0529 |
| 2020/0206497 A1 * | 7/2020 | Thyagarajan | A61N 1/323 |
| 2022/0040491 A1 * | 2/2022 | Sun | A61N 2/006 |

* cited by examiner

*Primary Examiner* — Michael W Kahelin
(74) *Attorney, Agent, or Firm* — Osha Bergman Watanabe & Burton LLP

(57) ABSTRACT

A method for minimally invasive deep brain simulation (DBS) involves obtaining a target location for the DBS, obtaining an anatomical model, and simulatively determining, for a set of antennas endocranially implanted at first positions and emitting electromagnetic waves differing by a frequency offset, a first envelope signal at the target location, using the anatomical model. The first envelope signal resulting from interference of the electromagnetic waves at the target location has an envelope signal frequency corresponding to the frequency offset.

20 Claims, 10 Drawing Sheets

MINIMALLY INVASIVE DEEP BRAIN STIMULATION USING ELECTROMAGNETIC WAVES

CROSS-REFERENCE TO RELATED APPLICATIONS

This application claims the benefit of priority under 35 U S.C. § 119(e) to U.S. Provisional Patent Application Ser. No. 63/274,401, filed on Nov. 1, 2021, which is hereby incorporated by reference herein in its entirety.

BACKGROUND

Field of Invention

The disclosed invention is in the general field of using a deep brain simulation (DBS) using electromagnetic (EM) waves suitable for treating brain disorders.

Overview

Nearly 30% of the global burden of diseases is attributed to brain disorders, like epilepsy, obsessive compulsive disorder (OCD) and depression. After 1st and 2nd line treatments fail, millions of people are unamenable to any other form of treatment. However, deep brain stimulation (DBS) is a therapeutic technology that has already improved the quality of life of over a 150,000 patients worldwide. DBS may be used to modulate brain activity, e.g., in order to treat neurological and psychiatric disorders such as Parkinson's disease, dystonia, essential tremor, epilepsy, and OCD. Because DBS requires electrode implantation within the brain, the procedure carries a risk of surgical complications such as intracranial hemorrhage, potentially limiting its appeal for widespread use. Several non-invasive techniques for neuromodulation have been introduced in clinical practice, e.g., Transcranial Magnetic Stimulation (TMS) and Transcranial Electrical Stimulation (TES). A major disadvantage of these techniques, however, is that neither can reach deep brain structures with the same spatial specificity as DBS. The efficacy of both TMS and TES is limited. When operating at therapeutic frequencies (≈100 Hz), these devices would need to be extremely large to focus the electrical energy at a small region inside the brain tissue. The resulting devices would be bulky and non-portable and/or cumbersome to wear. Additionally, neither TMS nor TES is capable of stimulating deep brain regions with the focality and intensity of DBS.

Recently temporal interference stimulation (TIS) technique, a novel approach for TES, to deliver two similar kilo-hertz electric currents via a pair of electrodes each for focal non-invasive deep brain stimulation (DBS) was reported. Subsequent modeling studies have attempted to optimize the modulation depth and focality of TIS by optimizing the currents and locations of two pairs or an array of electrodes. This technique enabled focal stimulation deep inside the mouse brain tissue without stimulating the overlying cortical regions. Using two high-frequency electric currents at 2 kHz and 2.01 kHz, each applied through a separate pair of electrodes, the investigators showed that the high-frequency electric fields individually did not elicit a neuronal response. Yet, wherever the two electric fields superimposed, neural firing was entrained to the difference frequency of 10 Hz. However, recent human brain modeling and algorithmic optimization works have shown that while TIS indeed offers higher focality than state-of-the-art TES, its electric field intensity is generally less than that of TES.

The interaction of EM waves with biological tissues has been extensively studied in literature for applications like microwave induced hyperthymia, microwave imaging for brain injury, breast cancer detection, monitoring of vital signs, wireless communication and power transfer to implanted devices, to name a few. In one study, the neural firing rate in zebra finches was recorded when exposed to a 900 MHz EM wave, pulse width modulated with a 217 Hz square waveform (12.5% duty cycle), as would be found in a GSM wireless signal. It was found that 76% of responding cells increased their firing rate by an average of 3.5× whereas the rest showed a decrease in their firing rate. However, experimental verification of selective stimulation of the neurons at depth, without eliciting neural activity in the overlying brain regions, using EM waves separated by a small frequency offset remains an open research problem.

Based on the above, recent substantial progress in clinical practice for neuromodulation has led to a demand for the development of a minimally invasive and/or non-invasive DBS setup using EM simulation at GHz frequency to achieve high focality and signal intensity at target locations using array sizes small enough to be endocranially implanted.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method for minimally invasive deep brain simulation (DBS), comprising: obtaining a target location for the DBS; obtaining an anatomical model; and simulatively determining, for a set of antennas endocranially implanted at first positions and emitting electromagnetic waves differing by a frequency offset, a first envelope signal at the target location, using the anatomical model, wherein the first envelope signal resulting from interference of the electromagnetic waves at the target location has an envelope signal frequency corresponding to the frequency offset.

In general, in one aspect, embodiments relate to a system for minimally invasive deep brain simulation (DBS), the system comprising: a simulation system configured to: obtain a target location for the DBS; obtain an anatomical model; and simulatively determine, for a set of antennas endocranially implanted at first positions and emitting electromagnetic waves differing by a frequency offset, a first envelope signal at the target location, using the anatomical model, wherein the first envelope signal resulting from interference of the electromagnetic waves at the target location has an envelope signal frequency corresponding to the frequency offset.

In general, in one aspect, embodiments relate to a system for minimally invasive deep brain simulation (DBS), the system comprising: a simulation system comprising a set of antennas, endocranially implanted in a patient, the stimulation system configured to: drive the set of antennas to emit electromagnetic waves differing by a frequency offset to generate an envelope signal at a target location in the patient, wherein the envelope signal resulting from interference of the electromagnetic waves at the target location has an envelope signal frequency corresponding to the frequency offset.

In light of the structure and functions described above, embodiments of the disclosure may include respective means adapted to carry out various steps and functions defined above in accordance with one or more aspects and any one of the embodiments of one or more aspect described herein.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

Like elements in the various figures are denoted by like reference numerals for consistency. detailed description of the invention.

DETAILED DESCRIPTION

Figure 1:
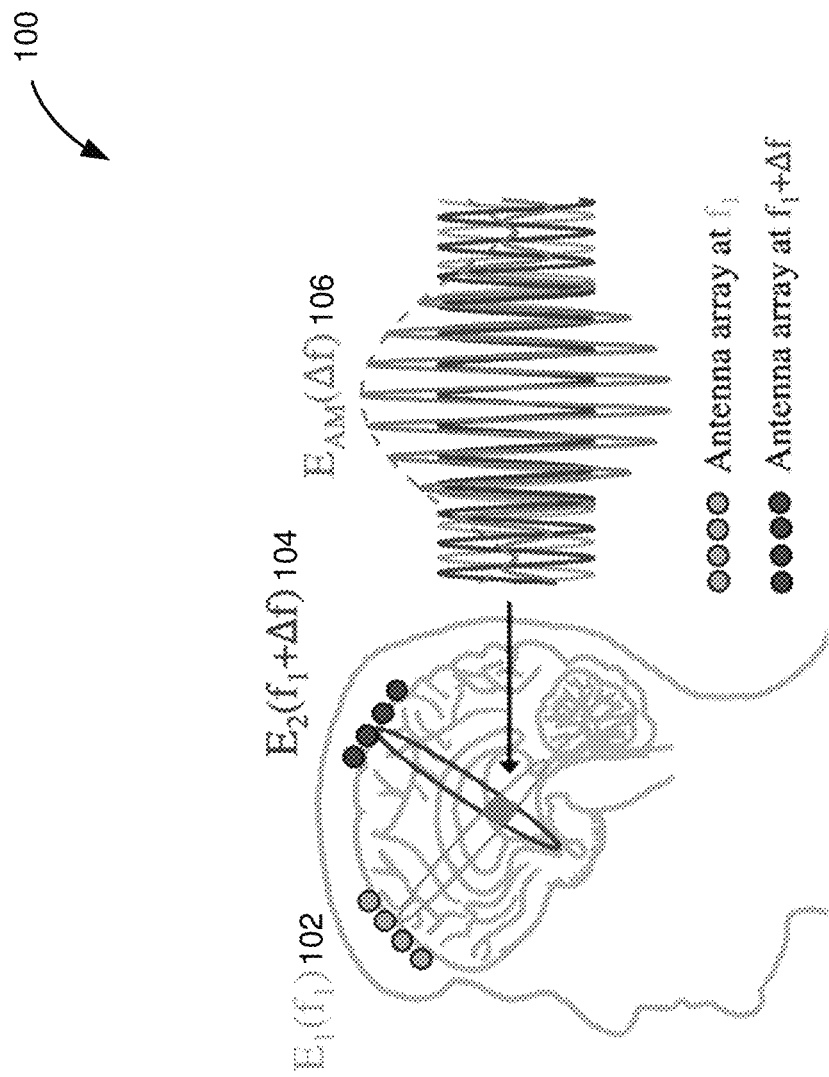
FIG. 1 shows a system diagram in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (for example, first, second, third) may be used as an adjective for an element (that is, any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-9, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a horizontal beam" includes reference to one or more of such beams.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Although multiply dependent claims are not introduced, it would be apparent to one of ordinary skill that the subject matter of the dependent claims of one or more embodiments may be combined with other dependent claims.

In general, embodiments disclosed herein are related to a system and a method for a minimally invasive DBS setup using temporally interfering electromagnetic (EM) waves. By leveraging on the small wavelength of the EM waves in a GHz range, high focality and high signal intensity at a target location may be achieved with array sizes small enough to be endocranially implanted. exploring the idea of minimally invasive DBS using. At GHz frequencies, it is possible to create antenna arrays at the scale of a few centimeters or less that can be endocranially implanted to enable longitudinal stimulation, circumvent signal attenuation due to scalp and skull, and achieve focal stimulation in target regions inside the brain tissue by manipulating both amplitude and phase of the EM field.

In the following description, a computational modeling framework is developed using electrical and thermal properties of human brain tissue. The propagation of GHz EM waves, generated by point source antenna elements and the corresponding heat generated in the brain tissue surface are investigated. Two optimization flows to identify antenna amplitudes and phases for either stimulation intensity or focality are used in embodiments of the disclosure. GHz EM waves may, thus, be an alternative way of stimulating deep brain targets and offer benefits that have not been shared by prior methodologies of electrical stimulation.

Using EM waves for electrical stimulation in the embodiments of the present disclosure may have one or more of at least the following benefits:
  (i) Creating of focused beams of electric fields using antenna arrays achieves not only high focality but also circumvents the problem of signal attenuation. For this purpose, one or more embodiments leverage the beamforming techniques used in array signal processing as discussed below.

(ii) Owing to smaller wavelengths of GHz frequencies in the brain tissue, both amplitudes and phases may be manipulated to achieve focal simulation. Neither TES nor TMS shares this benefit.

(iii) Since EM waves operate at high frequencies, very compact antenna arrays that may be endocranially implanted may be used. The resulting equipment may be portable and may allow for continuous operation, which is required for treatment of some diseases like Parkinson's disease. In comparison, TES and TMS are not portable technologies so far.

Embodiments of the present disclosure may be suitable for treatment of several neurological and psychiatric disorders such as Parkinson's disease, OCD, depression, and epilepsy.

FIG. 1 shows a system diagram (100) in accordance with one or more embodiments. More specifically, the system diagram (100) illustrates how superposition of electric fields from two antenna arrays (102) and (104) differing by a small frequency offset ($\Delta f$) may create a low frequency envelope signal. $E_1$ and $E_2$ are the phasor electric fields emitted by arrays (102, 104), respectively, and $E_{AM}$ (306) is the peak-to-peak value of the resulting envelope signal. Different approaches may be used to determine the $E_1$ and $E_2$ to be emitted. For example, an optimization may be performed to obtain a highly intense or highly focused electric field at a target location.

In one embodiment, GHz frequency EM waves, e.g., at frequencies $f_1=1.5$ GHz and $f_2=f_1+\Delta f$ at 1.5 GHz+100 Hz, are used to overcome some of the challenges of the prior electrical stimulation methodologies. The two GHz frequencies of 1.5 GHz and 1.5 GHz+100 Hz are selected high enough not to recruit neural firing individually but their difference frequency, in this example of 100 Hz, is low enough to modulate neurons wherever the two frequencies superimpose. While this example introduces particular frequencies, other frequencies may be used without departing from the disclosure.

The EM waves at GHz frequency may be radiated very efficiently using antennas. At GHz frequencies, small-sized antennas may be created at a scale of a few centimeters or less, as the dimension of an antenna is close to $\lambda/2=c/(2nf)$, where $\lambda$, is the wavelength of EM wave, c is the speed of light, f is the frequency of the EM wave and n is the refractive index of the medium in which the wave is propagating. Multiple antennas with amplitude and phase controls per antenna may be grouped as an antenna array to focus the EM radiation. Moreover, as the number of antennas in the antenna array increases, the more focal the beam may become, and the more signal attenuation it may overcome, even when each antenna in an array is fed with 1/M of the input signal power of a single operating antenna, where M is the number of antennas in the array.

Based on the above, EM waves at GHz frequency combined with TI stimulation opens up the possibility of a portable technology as small enough antenna arrays may be created that may be endocranially implanted yet creating highly focused beams of electric field. This setup not only allows for continuous operation, which is required for the treatment of certain diseases like Parkinson's disease, but also provide a device that is more discreet than TES or TMS while being minimally invasive. Treatment via such minimally invasive setup is already deployed as an FDA approved technology for epilepsy treatment. Additionally, embodiments disclosed herein for the EM wave at GHz stimulation allows the manipulation of both amplitude as well as phase of the electric field to achieve focal stimulation, owing to the small wavelength of GHz EM waves in the brain tissue. On the other hand, TES or TMS, operating at ~kHz range, only optimizes over amplitudes of electric field as the size of the brain is much smaller than the wavelength at those frequencies. Along with aforementioned benefits, one or more embodiments offer frequency of EM waves as an additional degree of freedom that may be utilized to optimize the trade-off between focality and intensity of the electric field.

The following paragraphs introduce the underlying mathematical framework, followed by specific embodiments. Additional details are provided in Ahsan F, Chi T, Cho R, Sheth S A, Goodman W, Aazhang B. EMvelop stimulation: minimally invasive deep brain stimulation using temporally interfering electromagnetic waves. J Neural Eng. 2022 Jul. 4; 19(4). doi: 10.1088/1741-2552/ac7894. PMID: 35700717, which is hereby incorporated by reference herein in its entirety.

Multiphysics Modeling

Figure 2:
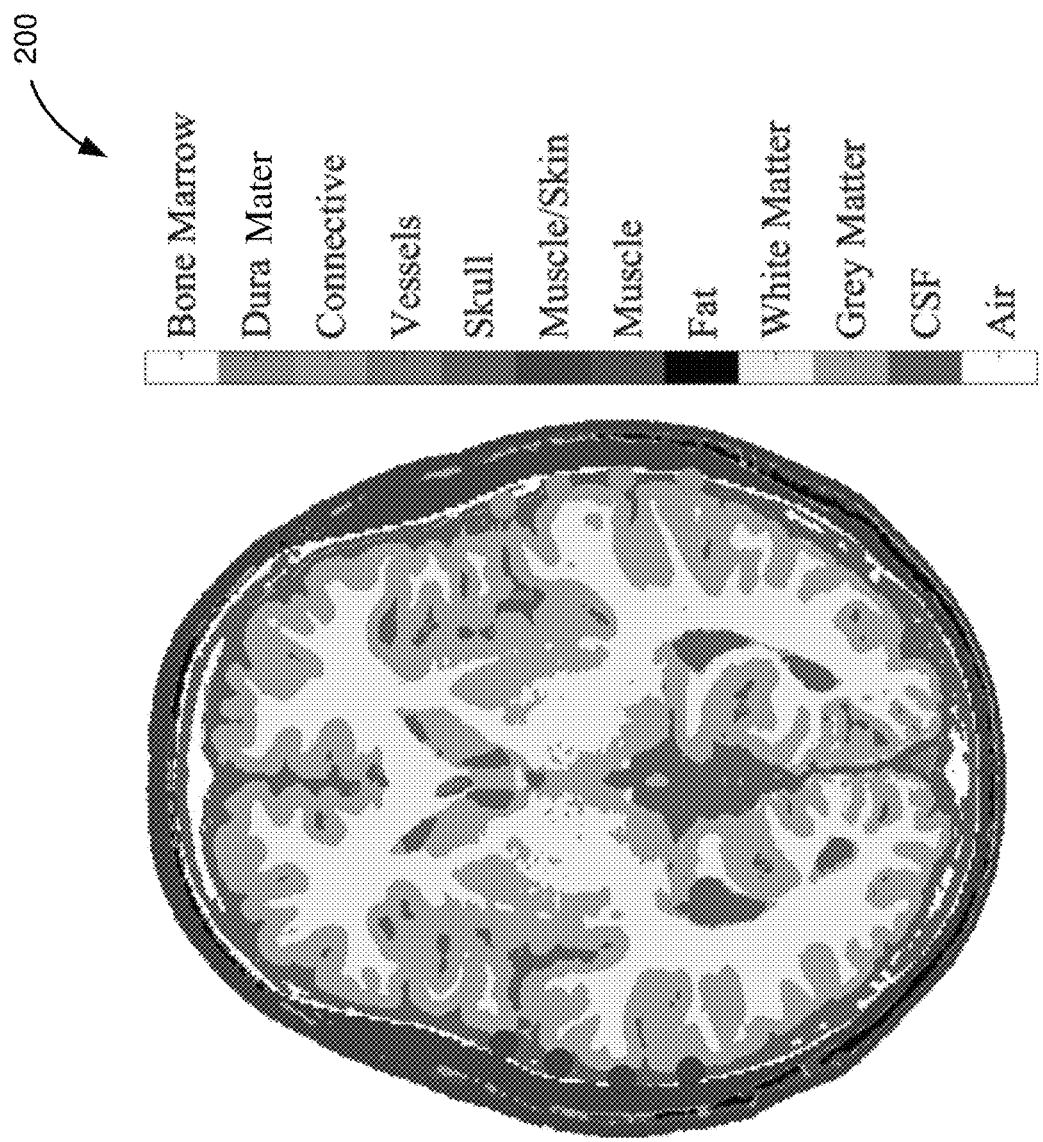
FIG. 2 shows an anatomical model of a human head constructed from MRI scans in accordance with one or more embodiments.

FIG. 2 shows an anatomical model (200) of human head constructed from MRI scans in accordance with one or more embodiments. The slice shown in FIG. 2 includes the following eleven tissue types: cerebro-spinal fluid (CSF), grey matter, white matter, fat, muscle, muscle/skin, skull, vessels, connective tissue (around fat), dura mater and bone marrow. For EM wave generation, antenna arrays may be placed endocranially on the dura mater. For electromagnetic wave propagation in a medium, each material type is characterized by its permeability $\mu$ and permittivity $\epsilon$, and when time-varying sinusoidal input currents at angular frequency of $\omega$ are provided to source antennas, the electric field E induced inside the brain tissue can be found by solving the wave equation $$\nabla \times \mu^{-1} \nabla \times E = \omega^2 \epsilon E. \tag{1}$$

Furthermore, an essential consideration for DBS using EM waves is to ensure that the stimulation is safe. IEEE Standard for safety levels concerning human exposure to EM fields specifies that the SAR which is defined as $$SAR(E) = \frac{\sigma |E|^2}{2\rho}, \tag{2}$$

where $\rho$ and $\sigma$ are the density and conductivity of the tissue, respectively, should be $\leq 10$ W kg-1 averaged over 10 g of tissue. Additionally, it also specifies that the temperature increase over the baseline body temperature should be less than $\leq 1°$ C. in the brain tissue due to EM wave propagation. Hence, to model the heat transfer in the brain tissue, the Pennes bioheat equation, which simulates the heat conduction between tissues, convection due to blood flow, and the heat generated due to EM wave propagation loss in the brain tissue, may be used. Therefore, the heat transfer in the human head is captured by Pennes bioheat equation as $$\nabla (k \nabla T) + \rho_b C_b \omega_b (T_b - T) + \frac{1}{2} \sigma |E|^2 = \rho C \frac{\partial T}{\partial t}, \tag{3}$$

where $\sigma$, $\rho$, C, k and T are the conductivity (S m$^{-1}$), density (kg m$^{-3}$), specific heat capacity (J (kg·K)$^{-1}$), thermal conductivity (W (m·K)$^{-1}$), and temperature (K) of the tissue, respectively, whereas $T_b$, $\rho_b$ and $C_b$ are the temperature (K), density (kg m$^{-3}$) and specific heat capacity (J (kg·K)$^{-1}$) of the blood, respectively. Here, $\omega_b$ denotes the volumetric flow rate of the perfusing blood per volume of tissue (ml s$^{-1}$ ml$^{-1}$). Equation (3) includes an additional term for metabolism heat source, which has been ignored here as it has not been a significant contributor to heat. For complex geometries, the closed-form solutions to (1) and (3), i.e., the electric field and temperature distribution, may be difficult to derive. Hence, numerical solutions may be found by dividing the brain tissue into smaller discrete nodes with each node assigned by its corresponding material properties of $\mu$, $\epsilon$, $\sigma$, $\rho$, C, k, and $\omega_b$, and then solving (1) and (3) using FEM.

Problem Formulation

The spatial location $r_n \in \mathbb{R}^3$ inside the brain tissue may be denoted for n=1, ..., N locations. Consider a setup in which m=1, ..., M antennas are available in an array i operating at frequency $f_i$, for $i \in \{1, 2\}$. Here, a frequency-domain phasor representation is used, which captures the amplitude and phase information of a sinusoid with a single complex number, i.e. a frequency-domain phasor $p \in \mathbb{C}^3$ corresponds to a time-domain waveform of $p'(t)=|p| \cos(2\pi f t + \angle p)$, where $\|\cdot\|$ and $\angle \cdot$ denote the magnitude and phase of the argument, respectively, and f denotes the frequency of the wave. Let phasor $s_{i,m} \in \mathbb{C}$ denote the excitation current of the mth antenna of array i. Then, the phasor electric field $E_{i,m}(r_n) \in \mathbb{C}^3$ induced at location $r_n$ due to this antenna is written as $$E_{i,m}(r_n) = a_{i,m}(r_n) s_{i,m}. \quad (4)$$

Here, the phasor $a_{i,m}(r_n) = [a_{i,m;x}(r_n)\ a_{i,m;y}(r_n)\ a_{i,m;z}(r_n)] \in \mathbb{C}^3$ denotes the CSI capturing the amplitude and phase of the three spatial components of the electric field induced at location $r_n$ due to passing unit amplitude and zero phase current at frequency $f_i$ through the mth antenna of array i, calculated numerically from (1). Using the superposition property of the wave equation, the total electric field $E_i(r_n) = E_{i;x}(r_n)\ E_{i;y}(r_n)\ E_{i;z}(r_n) \in \mathbb{C}^3$ generated at location $r_n$ due to M antennas of array i is written as $$E_i(r_n) = \sum_{m=1}^{M} E_{i,m}(r_n) = \sum_{m=1}^{M} a_{i,m}(r_n) s_{i,m} = A_{i,n}^\top s_i. \quad (5)$$

Here, $s_i = [s_{i,1} \ldots s_{i,M}] \in \mathbb{C}^M$ represents the excitation currents for the M antennas of array i, $A_{i,n} = [a_{i,n;x} a_{i,n;y} a_{i,n;z}] = [a_{i,1}(r_n) \ldots a_{i,M}(r_n)]^T \in \mathbb{C}^{M \times 3}$ denotes the CSI matrix between all the M antennas of array i and location $r_n$, and $a_{i,n;x} = [a_{i,1;x}(r_n) \ldots a_{i,M;x}(r_n)]$, $z_{i,n;y} = [a_{i,1;y}(r_n) \ldots a_{i,M;y}(r_n)]$, and $a_{i,n;z} = [a_{i,1;z}(r_n) \ldots a_{i,M;z}(r_n)] \in \mathbb{C}^M$ denotes the x, y, and z components of CSI between all antennas of array i and and location $r_n$, respectively. Finally, we can write the phasor electric field $E_i \in \mathbb{C}^{3N}$ generated due to array i at all the N locations inside the brain tissue using the matrix notation $$E_i = A_i s_i, \quad (6)$$

where $$E_i = \begin{bmatrix} E_i(r_1) \\ E_i(r_2) \\ \vdots \\ E_i(r_N) \end{bmatrix}, A_i = \begin{bmatrix} A_{i,1}^\top \\ A_{i,2}^\top \\ \vdots \\ A_{i,N}^\top \end{bmatrix} = \begin{bmatrix} a_{i,1}(r_1) & a_{i,2}(r_1) & \ldots & a_{i,M}(r_1) \\ a_{i,1}(r_2) & a_{i,2}(r_2) & \ldots & a_{i,M}(r_2) \\ \vdots & \vdots & \ddots & \vdots \\ a_{i,1}(r_N) & a_{i,2}(r_N) & \ldots & a_{i,M}(r_N) \end{bmatrix},$$

and $$S_i = \begin{bmatrix} s_{i,1} \\ s_{i,2} \\ \vdots \\ s_{i,M} \end{bmatrix}.$$

It can be seen from (6) that the parameters of the problem to be solved are the values of $s_i$ (both amplitude and phase), which may be optimized to steer the electric field $E_i$ to the desired direction.

Figure 3:
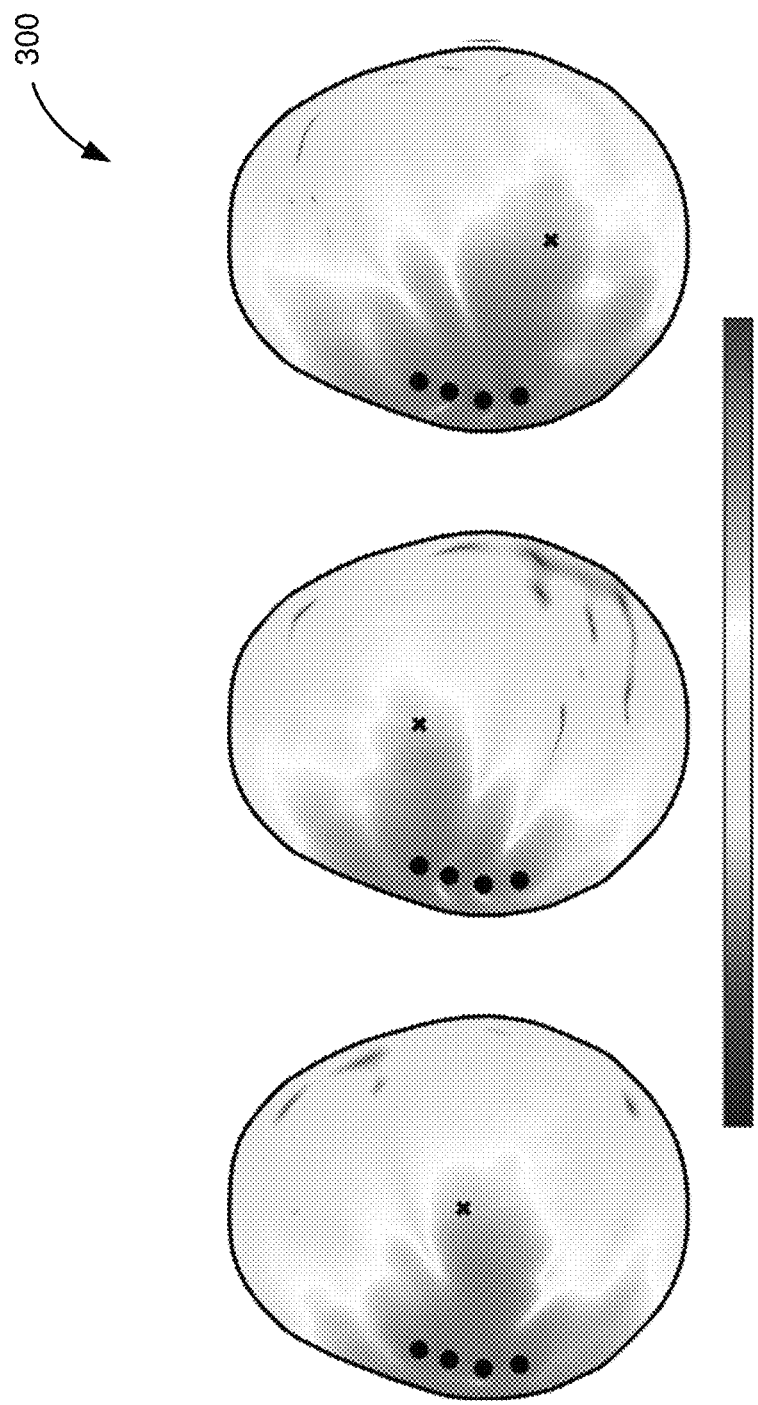
FIG. 3 shows examples of steering an electric field in a 2D brain slice in accordance with one or more embodiments.

FIG. 3 shows examples of steering the electric field in a 2D brain slice from a single antenna array for the center, top, and bottom targets, denoted as a black cross, respectively. The characteristic sinc-shaped antenna beam pattern emitted by the antennas (black dots) and consisting of a strong main beam and multiple relatively weaker sidelobes is evident. The main beams and side lobes at both antenna arrays operating at frequencies f1 and f2=f1+Δf, respectively, may be completely simulated. With M antennas in an array, there are 2 M degrees of freedom available to shape the electric field.

In one or more embodiments, the first electromagnetic and bioheat transfer modeling as well as algorithmic optimization framework are used for investigating the potential of the EM wave at GHz frequency combined with TI stimulation for minimally invasive DBS by using the implantable arrays of antennas that generate electromagnetic waves at GHz frequencies to stimulate tissue deep inside the brain without off-target effects. Two separate arrays are used, emitting EM radiation at GHz frequencies offset by a small amount (for example, $f_1$ at 1.5 GHz and $f_2=f_1+\Delta f$ at 1.5 GHz+100 Hz) in order to modulate neurons at a frequency corresponding to the offset between the two (i.e. 100 Hz in the previous example). The arrays may be amplitude- and phase-controlled to steer the interference pattern to focus on a particular region of the brain so that the maximum power is only applied to a specific region. In regions which only "see" an EM field of frequency several GHz, no neural stimulation should occur due to the low-pass filtering properties of neural tissue. With antenna arrays of approximately 4.6 cm in length, a stimulating electric field can be realized over a 3-4 cm-sized region, with minimal off-target energy delivered outside this area.

Temporal Interference Stimulation and Amplitude Modulated Signal Envelope

Two sinusoidal electric fields differing by a frequency of Δf interfere to create an amplitude modulated electric field, referred to here as an envelope signal. The intensity of the envelope signal is denoted by its 0-peak value and its amplitude modulation depth is denoted by the peak-to-peak value of its envelope, $E_{AM}(r_n)=2 \min(\|E1(r_n)\|, \|E2(r_n)\|)$, where $\|\cdot\|$ denotes the L2-norm of the argument, i.e., $\|E_i(r_n)\| = \sqrt{|E_{i;x}(r_n)|^2 + |E_{i;y}(r_n)|^2 + |E_{i;z}(r_n)|^2}$. Finally, the amplitude modulation depth of the envelope signal throughout the brain tissue is given by $$E_{AM} = \begin{bmatrix} E_{AM}(r_1) \\ E_{AM}(r_2) \\ \vdots \\ E_{AM}(r_N) \end{bmatrix} = \begin{bmatrix} 2\min(\|E_1(r_1)\|, \|E_2(r_1)\|) \\ 2\min(\|E_1(r_2)\|, \|E_2(r_2)\|) \\ \vdots \\ 2\min(\|E_1(r_N)\|, \|E_2(r_N)\|) \end{bmatrix}. \quad (7)$$

Figure 4:
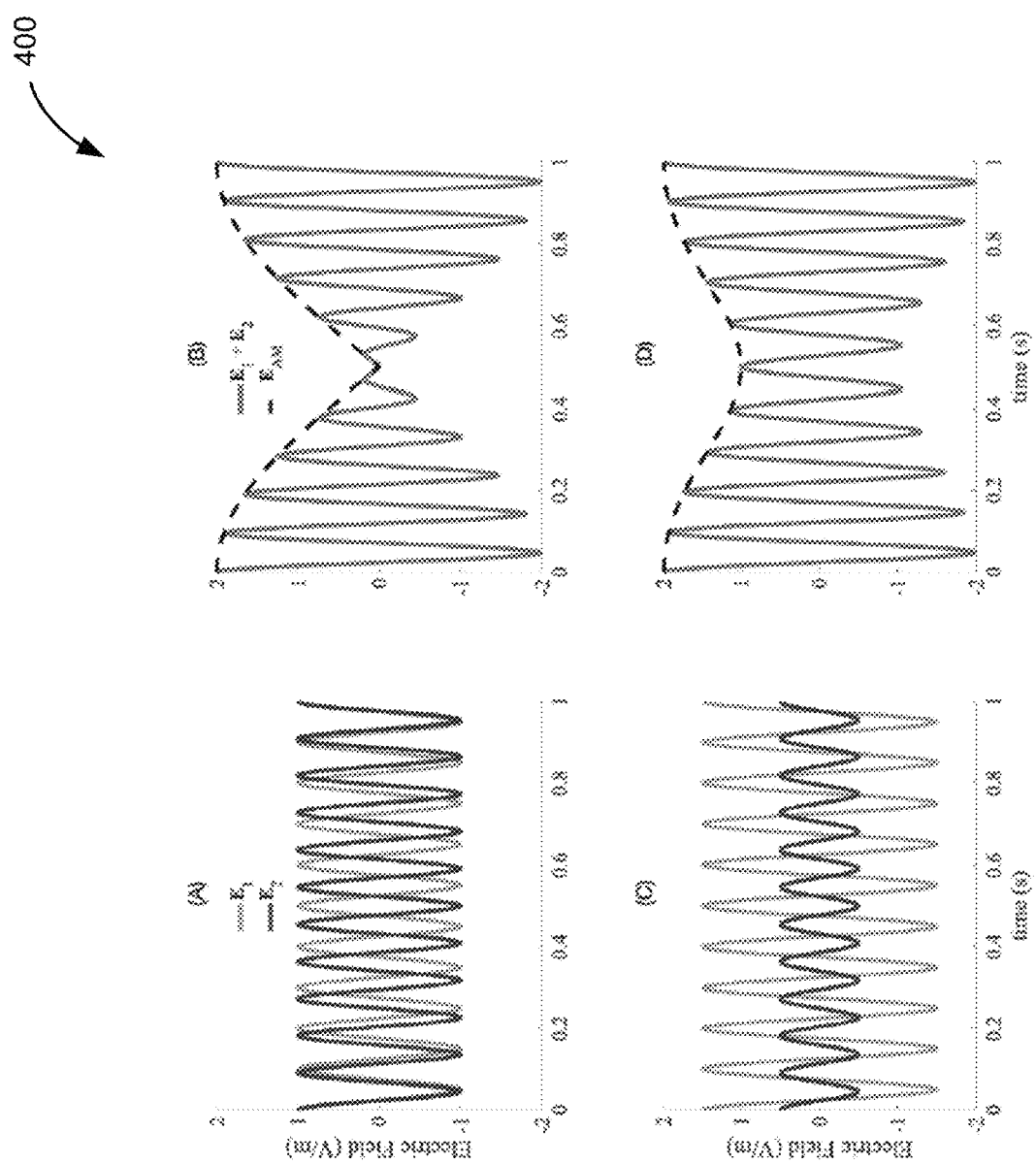
FIG. 4 shows examples of temporal interference stimulation in accordance with one or more embodiments.

The significance of the amplitudes of the two interfering waveforms in determining the depth of amplitude modulation at any location in the brain is demonstrated in FIG. 4 showing examples of interference stimulation (400), which plots time-domain waveforms $E_1(t)$, $E_2(t)$ and $E_{AM}(t)$ for two representative scenarios: one in which the amplitude of both the electric fields is equal (A), (B), and one in which the amplitude of one of the electric fields is less than the other (C), (D). $E_{AM}$ is maximal when the amplitude of $E_1(t)$ is equal to that of $E_2(t)$ in accordance to one or more embodiments. For such scenarios, the terms intensity and modulation depth can be used interchangeably. In all the other cases, it will be less than the intensity, as $\|E_1\|+\|E_2\|>2\min(\|E_1\|, \|E_2\|)$ for $\|E_1\|=\|E_2\|$, and the min operation in (7) will choose the smaller amplitudes of $E_1$ or $E_2$ and twice that will be the resultant $E_{AM}$. One way to effectively steer the electric field inside the brain tissue would be to employ the maximum ratio transmission (MRT) approach, which is a popular beamforming technique used in wireless communications for maximizing the signal strength at a target location n=T. However, the problem in this disclosure is different from the standard far-field MRT due to operation in the near-field region where the parallel-ray approximation does not hold. Additionally, MRT beamforming does not jointly optimize $s_i$ catering for the relationship between the amplitudes of the two interfering electric fields, given by (7), in determining the modulation depth and intensity of envelope signal stimulation. Hence, in order to overcome these limitations and investigate the tradeoff between stimulation intensity and focality, the subsequently described two optimization approaches may be used.

Maximal Intensity Transmission

Maximal Intensity Transmission (MIT), in one or more embodiments, determines the maximum intensity achievable at the target, under consideration of the EM wave safety constraint. The process may be broken in two steps. First, an optimization may be performed to achieve an arbitrary desired amplitude modulation depth $E_{AM,d}$ at the target point T, i.e., $E_{AM}(r_T)=E_{AM,d}$ and solve the optimization criterion $$\min_{s_1,s_2}\left(\frac{E_{AM,d}}{2}-\|A_{1,T}^\top s_1\|\right)^2 \quad (8a)$$

$$\text{such that } \|A_{1,T}^\top s_1\|=\|A_{2,T}^\top s_2\|. \quad (8b)$$

Optimization (8) is motivated by the observation that amplitude modulation depth is maximum, and is equal to intensity, when the amplitude of both interfering electric fields is equal, as previously discussed. Hence, the optimization ensures that the desired $E_{AM,d}$ is achieved at the target location by providing $E_{AM,d}/2$ due to the electric field generated by M antennas of array 1 and the other half due to M antennas of array 2 (8b). The exact value of $E_{AM,d}$ may not affect the optimization as the $s_i$ specified by the optimization (8) can be scaled by a constant $\tilde{d}\in\mathbb{R}$ to achieve any value of $E_{AM}(r_T)$ (which can be seen by considering $E_{AM}=2\min(\|\tilde{d}A_1s_1\|, \|\tilde{d}2\min(\|A_1s_1\|, \|A_2s_2\|)$. Finally, to find the maximum intensity achievable, $\tilde{d}$ may be identified such that the safety constraint is satisfied.

Maximal Focality Transmission

In Maximal Focality Transmission (MFT), in one or more embodiments, the antenna parameters that specify the maximum intensity achievable while minimizing off-target power and observing the safety constraint are identified. In a first step, an optimization may be performed to achieve a specified $E_{AM}(r_T)=E_{AM,d}$ while minimizing the off-target power. The following optimization problem may be solved:

$$\min_{s_1,s_2}\sum_{n=1,n\neq T}^{N}\left(\min(\|A_{1,n}^\top s_1\|, \|A_{2,n}^\top s_2\|)\right)^2 \quad (9a)$$

such that $\|A_{1,T}^\top s_1\|=\|A_{2,T}^\top s_2\|$ (9b)

$$\|A_{1,T}^\top s_1\|=\frac{E_{AM,d}}{2}. \quad (9c)$$

The objective (9a) ensures that the electric field power is minimized at all the locations except the target T whereas the constraints (9b) and (9c) ensure that the desired electric field intensity is still maintained by providing $E_{AM,d}/2$ from M antennas of array 1 and the other half from the M antennas of array 2. Finally, $s_i$ may be scaled using a constant $\tilde{g}\in\mathbb{R}$ such that the safety constraint is satisfied.

Setup

Multiphysics modeling simulations may be performed based on a randomly selected human head model. For example, one or more subjects may be selected from from BrainWeb, a library of realistic digital human brain phantoms collected from MRI scans. In one example, the imported geometry of the human head model consists of 362×434×362 voxel values. Each voxel is a cell with dimensions of 0.05 cm×0.05 cm×0.05 cm, which translates to an overall spatial size of 18.1 cm×21.7 cm×18.1 cm for the human head model. The model provides tissue segmentation of voxels into the following 11 tissue types: CSF, grey matter, white matter, fat, muscle, muscle/skin, skull, vessels, connective tissue (around fat), dura mater, and bone marrow. Each voxel contains a value that corresponds to the tissue that contributes most to that voxel. Each voxel is assigned with its material properties of $\mu$, $\epsilon$, $\sigma$, $\rho$, C, k, and $\omega_b$.

For evaluating the electric field due to the propagation of EM waves generated by antenna arrays through the brain tissue, (1) may be numerically calculated by performing frequency-domain Finite Element Methods (FEM) simulations. Moreover, the average SAR, given in (2), may be calculated in the brain tissue by expanding a cube around a pixel (in x-direction, the cube is expanded inside the brain from the pixel, whereas in y and z-directions, the expanding is performed expand equally in both these directions from the pixel). Only regions corresponding to the brain are included in the averaging. In addition to this, for finding the heat generated in the human head as a result of EM wave propagation, the temperature distribution may be computed inside the head at thermal equilibrium by numerically evaluating (3). These modeling simulations may be performed, for example, in COMSOL Multiphysics. The EM wave and heat transfer studies may be joined via one-way coupling. Hence, the software first solves the EM wave frequency-domain study and then uses the heat generated due to EM radiations as a source term for the subsequent heat transfer study. Triangular meshes may be used to discretize the imported human brain model. The simulation domain is terminated in a physically matched boundary layer for EM wave study and an insulating boundary condition for heat transfer study (which simulates the worst case scenario). A parametric sweep may be performed over the maximum mesh size in COMSOL Multiphysics. In this sweep, the maximum mesh size inside the brain tissue is progressively decreased until the results converged to within 1% tolerance of the finest mesh size possible (based on available computational resources). In one example, a maximum mesh size of 0.1 cm was chosen. A similar sweep was done for 3D simulations and a maximum mesh size of 0.5 cm was chosen as a good trade-off between accuracy and computation time.

Results

The stimulation of targets placed on a transversal slice of the human brain tissue was studied. Given the nonlinear and non-convex nature of the optimization problems, such a simplification was adopted to reduce the computational resources and time needed to find a suitable location for the antenna arrays to target a specific location inside the brain tissue. Therefore, 2D simulation was first performed on that transversal slice to understand the effect of different antenna locations and optimizations on the intensity and focality of envelope signal stimulation. Next, more resource intensive 3D simulations were performed to verify the final design. Similar modeling guidelines can also be used to stimulate targets varying along the sagittal plane.

Figure 5:
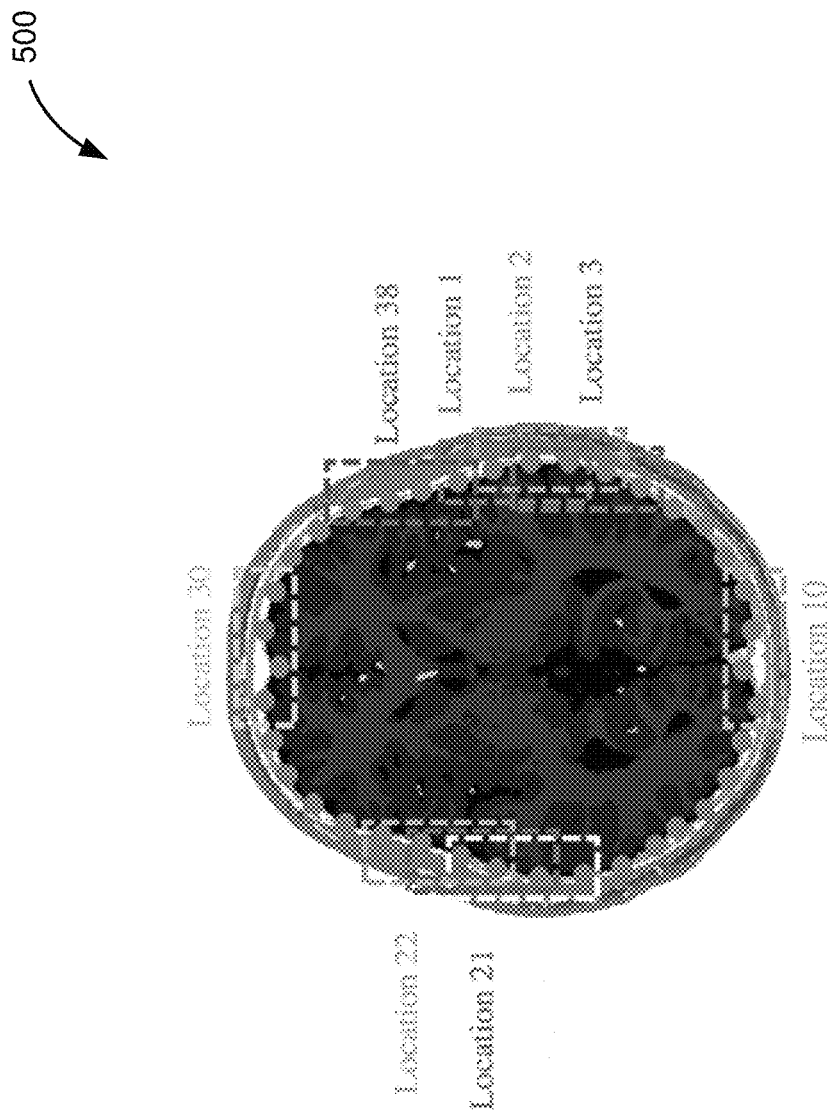
FIG. 5 shows examples of an endocranial antenna placements in accordance with one or more embodiments.

2D modeling: A transverse slice at a spatial depth of 7.5 cm is chosen. The slice is shown in FIG. 2. $f_1=1.5$ GHz and $f_2=1.5$ GHz+100 Hz were chosen. Point source antennas were placed at approximately $\lambda/2$ spacing at $f_1$ endocranially, as shown in FIG. 5. By this method, a total of 38 antennas with a spacing of approximately 1.4 cm between were placed. Due to size constraints of the endocranial design, only four adjacent antenna arrays per frequency are active at a given time. The potential locations of arrays are made by staggering four antennas together to create on average 4.2 cm sized arrays. As illustrated in FIG. 5, starting from location 1, new array locations are created by including the next adjacent antenna and removing the furthest antenna of the array while moving in a clockwise direction. Each antenna location can be occupied by an antenna operating at either $f_1$ or $f_2$ or both simultaneously.

Comparison of the two targeting strategies: In this section, MIT and MFT are discussed and compared, for the following two criteria: (i) focality, which is defined as the square-root of the area with amplitude modulation depth $E_{AM} \geq 50\%$ of the amplitude modulation depth at the target point (For example, if $E_{AM}(r_T)=10$ V m$^{-1}$, we calculate the area of the region with $E_{AM} \geq 5$ V m$^{-1}$. Suppose this area is 9 cm$^2$. When taking the square-root of it, this corresponds to a length-scale of 3 cm and is the focality in this case), and (ii) $E_{AM}(r_T)$, the maximum amount of modulation depth that can be safely achieved at the target while following the IEEE guidelines that temperature increase over the baseline body temperature should be $\leq 1°$ C.

Figure 6:
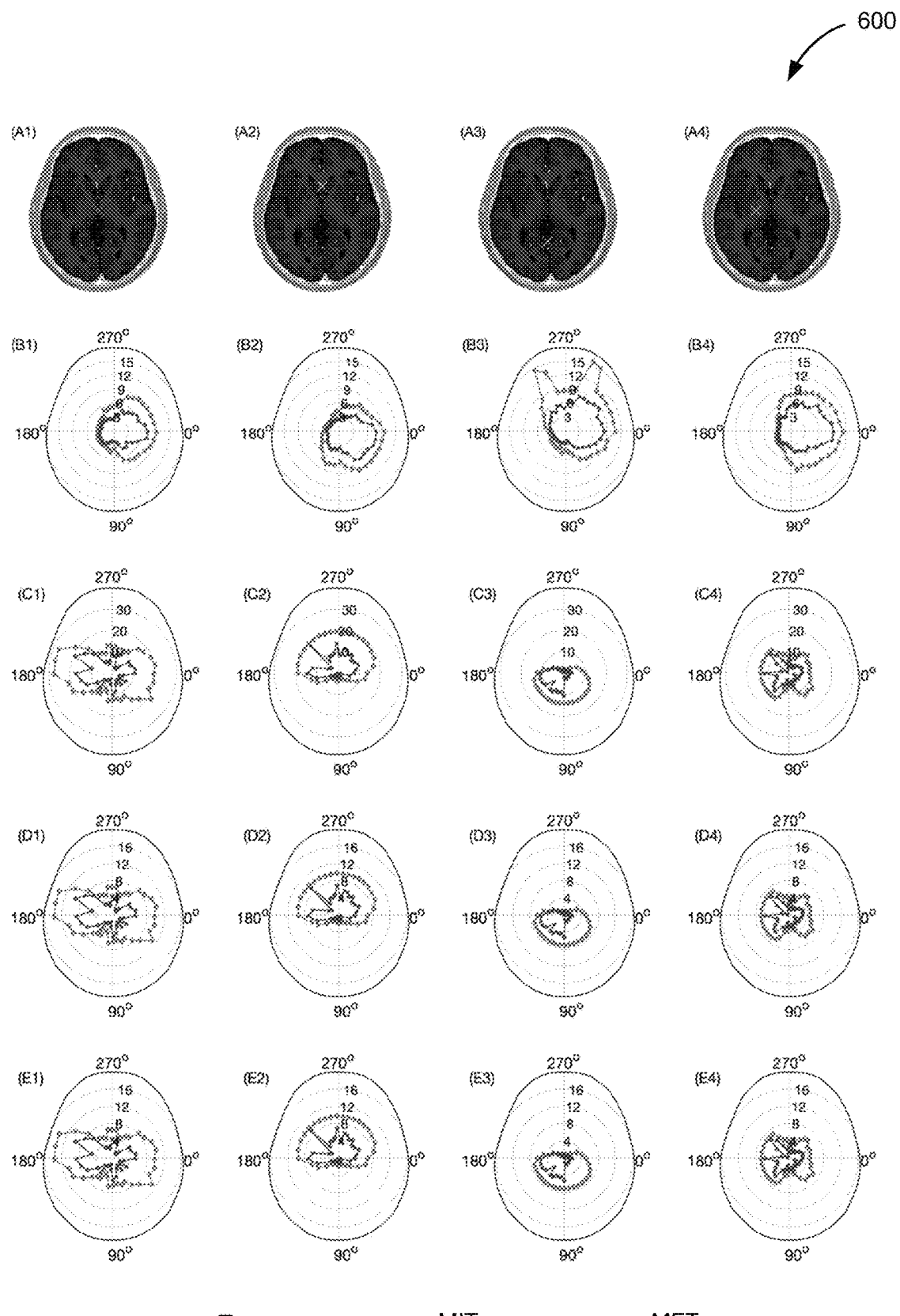
FIG. 6 shows examples of targeting strategies in accordance with one or more embodiments.

The performance of the above techniques may be assessed across a range of antenna positions by fixing the array on frequency $f_1$ at location 1, as shown in FIG. 5 5, and call it the reference location. Next, the location of the array at frequency $f_2$ may be changed through 1, . . . , 38 array locations, effectively increasing the angular spacing between the arrays from 0° to 360°. This setup may help evaluate the relationship between angular spacing between the two arrays for the performance criteria mentioned above. Read differently, this setup also provides information on the steering capability of the antenna arrays, i.e. if the array locations are kept fixed at a particular position for each array, this provides input on how well the electric field can be steered to different targets. In this example, four stimulation targets in the brain tissue were chosen, as shown in FIG. 6(A1)-(A4) for comparison of the targeting strategies (600), named center, top, bottom, and left, respectively. The process is summarized as follows: It is assumed that a specified $E_{AM,d}$ is required at the target. Then, the optimizations for MIT ((8a) s.t. (8b)) and MFT ((9a) s.t. (9b) and (9c)) are performed. Since both optimizations are identified as non-convex and nonlinear, the optimizations are solved by an interior point algorithm implemented, e.g., in MATLAB as FMINCON. Both optimizations may be initialized by $s_i=a^*_i$, $r_T$. Next, the maximum amount of electric field safely deliverable by MIT and MFT to the human brain tissue is evaluated by scaling s, optimized by the two strategies, by $\tilde{d}$ and $\tilde{g}$, as previously discussed, such that the increase in baseline body temperature is $\leq 1°$ C.

FIG. 6 (B1)-(B4) shows the focality achieved by MIT and MFT across different targets as a function of the angular spacing between the arrays, when the array at frequency $f_1$ is fixed at 0°. Because of the explicit optimization to reduce the off-target power, MFT has the highest focality for all array separations and target locations.

FIG. 6 (C1)-(C4) shows the corresponding $E_{AM}(r_T)$ that can be safely delivered while maintaining the focality mentioned above. MIT achieves the highest electric field intensity at the targets for all array separations. On the other hand, MFT has lower electric field intensity than MIT as it attempts to reduce the off-target power. Further, an intensity-focality trade-off is observable. In addition to this, the figure shows that the location of both arrays plays a significant role in determining the focality and electric field intensity safely deliverable. Also, by inspection of 6(D1)-(D4) and 6(E1)-(E4) that $\|E_1(r_T)\|=\|E_2(r_T)\|$ for both MIT and MFT across all the target locations and array separations can be verified. Finally, based on the analysis, an angular separation of 180° between the arrays (or equivalently, from FIG., when array 1 is at location 1 and array 2 is at location 20) as the arrays' locations that provide both high intensity as well as focality across all the target locations, may be chosen.

3D modeling: For 3D modeling, the two arrays are placed 180° w.r.t each other. For example, two arrays of size 4.2 cm×4.7 cm consisting of twelve line current antennas each, which simulate the practical radiation pattern of a dipole antenna, may be placed endocranially on dura mater. Two criteria are compared: (i) focality, which is defined as the cube-root of the volume with amplitude modulation depth $E_{AM} \geq 50\%$ of the amplitude modulation depth at the target point (For example, if $E_{AM}(r_T)=10$ V m$^{-1}$, the volume of the region with $E_{AM} \geq 5$ V m$^{-1}$ is calculated. Suppose this area is 27 cm$^3$. Taking the cube-root, this corresponds to a length-scale of 3 cm and is the focality in this case), and (ii) $E_{AM}(r_T)$, the maximum amount of modulation depth that can be safely achieved at the target while following the IEEE guidelines that averaged SAR should be $\leq 10$ W kg$^{-1}$ averaged over 10 g of tissue.

Figure 7:
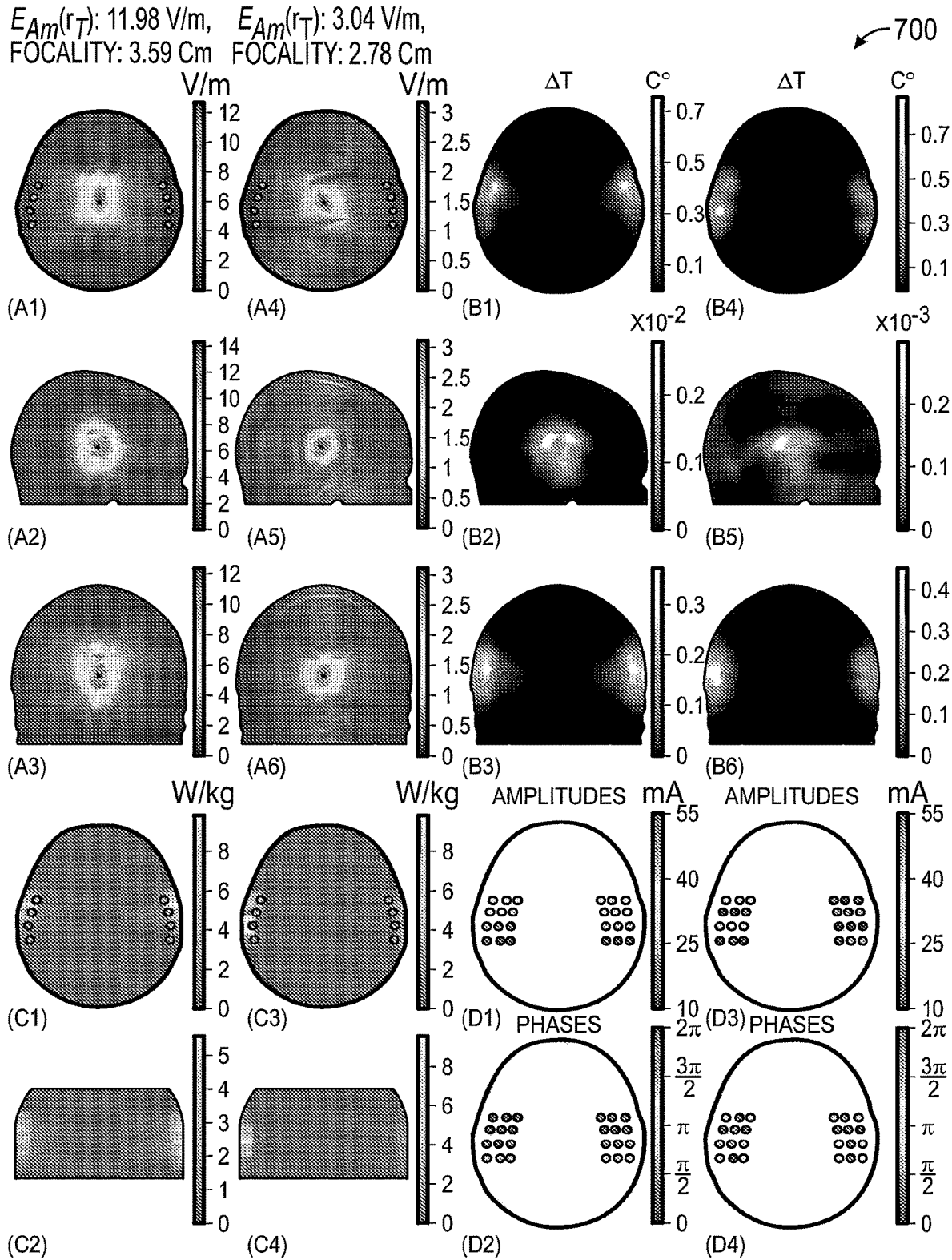
FIG. 7 shows examples of targeting strategies in accordance with one or more embodiments.

FIG. 7 shows results of comparison of MIT and MFT optimization schemes (700), for the center target location. While not shown, similar plots may be generated for top, bottom, and left targets. In FIG. 7, panels (A1)-(A3), (B1)-(B3), (C1)-(C2), and (D1)-(D2) show the results for amplitude modulation depth $E_{AM}$, increase in temperature over baseline body temperature $\Delta T$, SAR($E_1$)+SAR($E_2$) averaged over 10 g of tissue, and antenna current amplitudes $|s_i|$, and phases $\angle s_i$ for MIT, respectively. Panels (A4)-(A6), (B4)-(B6), (C3)-(C4), and (D3)-(D4) show the results for amplitude modulation depth $E_{AM}$, increase in temperature over baseline body temperature AT, antenna current amplitudes $|s_i|$, and the antenna current phases Ls, for MFT, respectively.

Analogous to the 2D modeling, a trade-off between higher stimulation intensity values at the cost of decreased focality are observed. When optimizing for maximal intensity of envelope signal stimulation, intensity (focality) values ranging from 11.98 V m$^{-1}$ (3.59 cm)-4.93 V m$^{-1}$ (3.18 cm) were achievable, and when optimizing for maximal focality of envelope signal stimulation, intensity (focality) values ranging from 3.04 V m$^{-1}$ (2.78 cm)-0.44 V m$^{-1}$ (2.39 cm) were achievable at targets deep inside the brain tissue.

While the above description is for certain frequencies, other frequencies may be used without departing from the disclosure. For example, by increasing the frequency of the antenna arrays $f_1$=X GHz and $f_2$=X GHz+100 Hz for X∈{2.5 GHz, 3.5 GHz}, more antennas can be packed in the same form factor with λ/2 spacing, thereby creating narrower beams of electric fields. However, the dielectric loss also increases at higher frequencies, leading to a trade-off. Through this approach, higher focality can be achieved by keeping the array size constant while the electric field intensity might still be sufficient to drive neural activity in superficial brain regions.

Figure 8:
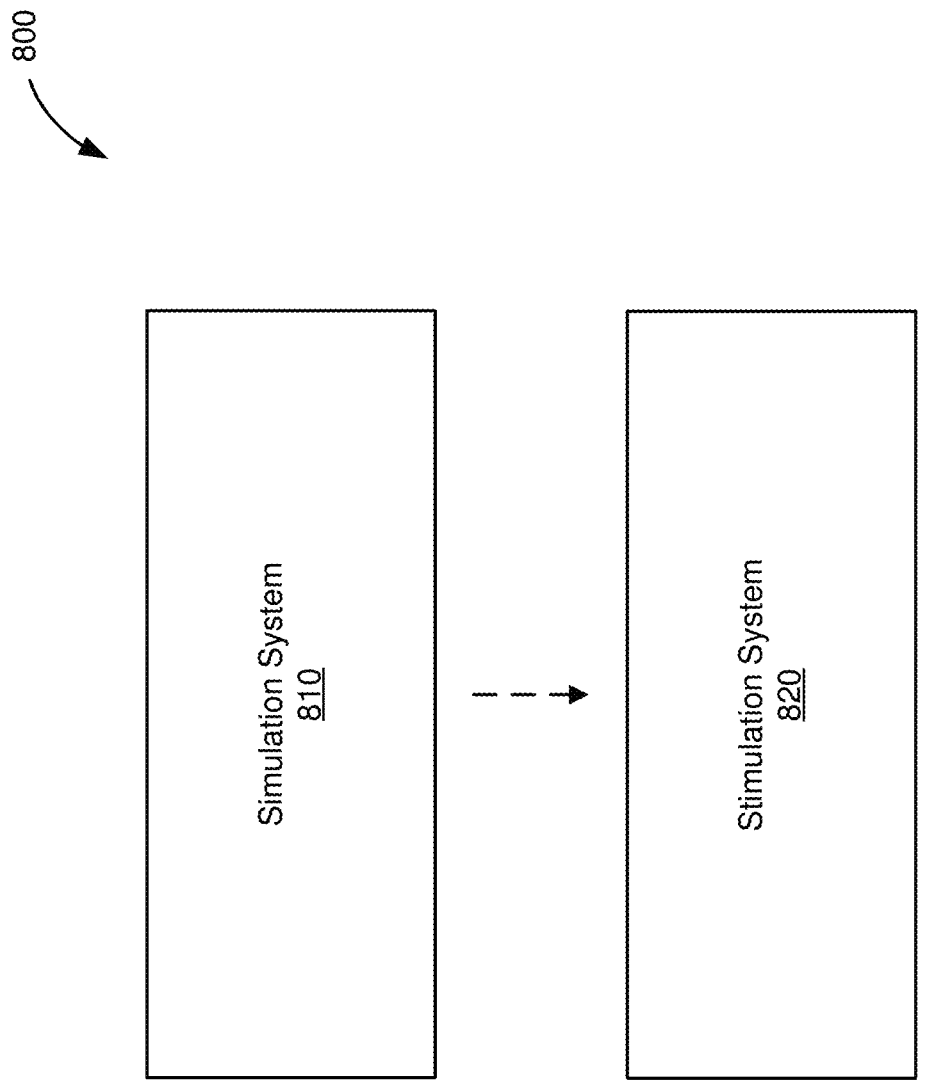
FIG. 8 shows a system in accordance with one or more embodiments.

FIG. 8 shows a system (800) in accordance with one or more embodiments. The system (800), in one or more embodiments, includes a simulation system (810). The simulation system may include any of the previously discussed components, software and/or hardware, that may be used to simulatively determine parameters of a minimally invasive deep brain stimulation. Any of the described modeling and simulation operations may be performed on a computing system, e.g., as described below in reference to FIG. 10. Based on the parameters determined using the simulation system (810), a stimulation system (820) may be implemented. The stimulation system (820) may include components that were previously discussed, for example, antenna arrays that may be surgically implanted at locations determined using the simulation system (810). The stimulation system (820) may include additional components which may be wearable or non-wearable. For example, the stimulation system (820) may include driver circuits configured to drive the antenna arrays to emit electric fields via the antenna arrays, according to a parameterization determined by the simulation system (810). Other components such as power supplies, computing devices, etc., may be included.

Figure 9:
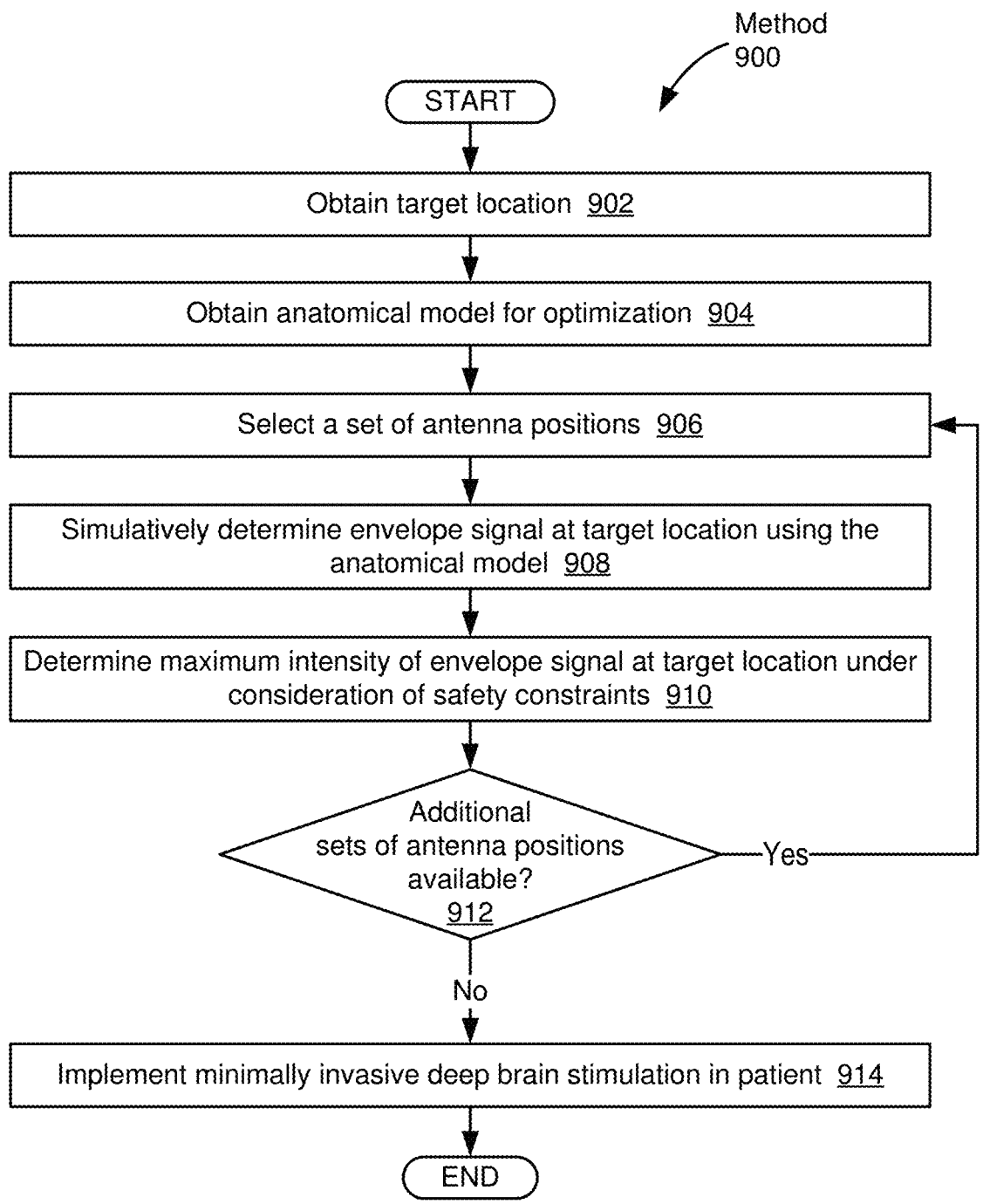
FIG. 9 shows a method in accordance with one or more embodiments.

FIG. 9 shows a flowchart of a method (900), in accordance with one or more embodiments. The flowchart may be viewed as a formalization of the previously described steps. Execution of the flowchart may result in the determination of a parameter set for minimally invasive deep brain stimulation using electromagnetic waves.

It is to be understood that one or more of the steps shown in the flowcharts may be omitted, repeated, and/or performed in a different order than the order shown. Accordingly, the scope of the invention should not be considered limited to the specific arrangement of steps shown in the flowcharts.

In Step 902, a target location is obtained. The target location may be an anatomical region at which electromagnetic energy is to be provided at a specified frequency and amplitude, e.g., for therapeutic reasons as previously discussed. Examples of target locations are shown in FIG. 3. The target location may be determined, for example, by a physician.

In Step 904, an anatomical model is obtained. The anatomical model may subsequently be used for the optimization of the parameter set to be used for the minimally invasive deep brain stimulation. The anatomical model may be an anatomical model of a human head, e.g., as shown in FIG. 2. The anatomical model may be constructed from MRI scans. In one or more embodiments, the anatomical model identifies different types of tissue such as, for example, cerebro-spinal fluid (CSF), grey matter, white matter, fat, muscle, muscle/skin, skull, vessels, connective tissue (around fat), dura mater and bone marrow. Each type of tissue may be characterized by its permeability p and permittivity c. The anatomical model may be obtained from a database and/or maybe custom-developed based on the anatomy of a patient. A 2D (slice) or 3D (volume model) may be obtained, depending on the optimization to be performed.

In Step 906, in order to set up the simulation of Step 908, antenna positions are selected, e.g., as described in reference to FIG. 6.

In Step 908, the amplitude of an envelope signal at the target location is simulatively determined for the selected antenna positions and using the anatomical model. The simulations may be performed as previously described, e.g., in reference to FIG. 5 and may aim for a maximal intensity transmission (MIT) and/or a maximal focality transmission (MFT). The simulations may be performed in 2D or 3D space. The simulation may be performed for a selected set of frequencies $f_1$, $f_2$, of the electromagnetic waves to be emitted by the antennas. $f_1$, $f_2$ may be selected based on various considerations as discussed, including the desired frequency of the envelope signal.

In Step 910, the maximum intensity (e.g., characterized by amplitude) of the envelope signal at the target location is determined under consideration of safety constraints, e.g., to remain below specified limits based on the specific absorption rate (SAR) of the tissues exposed to the electromagnetic field.

In Step 912, if additional sets of antenna positions are available for simulation, Steps 906-910 may be repeated.

After completion of the above steps for multiple sets of antenna positions, simulation results may be available for these multiple sets of antenna positions. Some sets of antenna positions may prove to be better than other sets of antenna positions, e.g., based on focality, intensity, etc. Further, some antenna positions may be preferred over other antenna positions, e.g., based on surgical considerations when implanting the antennas under the skull.

In Step 914, the minimally invasive deep brain stimulation may be implemented in the patient, based on the simulation results. Antennas may be implanted at antenna locations determined based on the simulation results. Further the power of the electromagnetic emissions by the antennas may be adjusted base on the desired amplitude at the target location, patient response, etc. The adjustment may be limited to what is considered safe, based on the result of the execution of Step 910.

Figure 10:
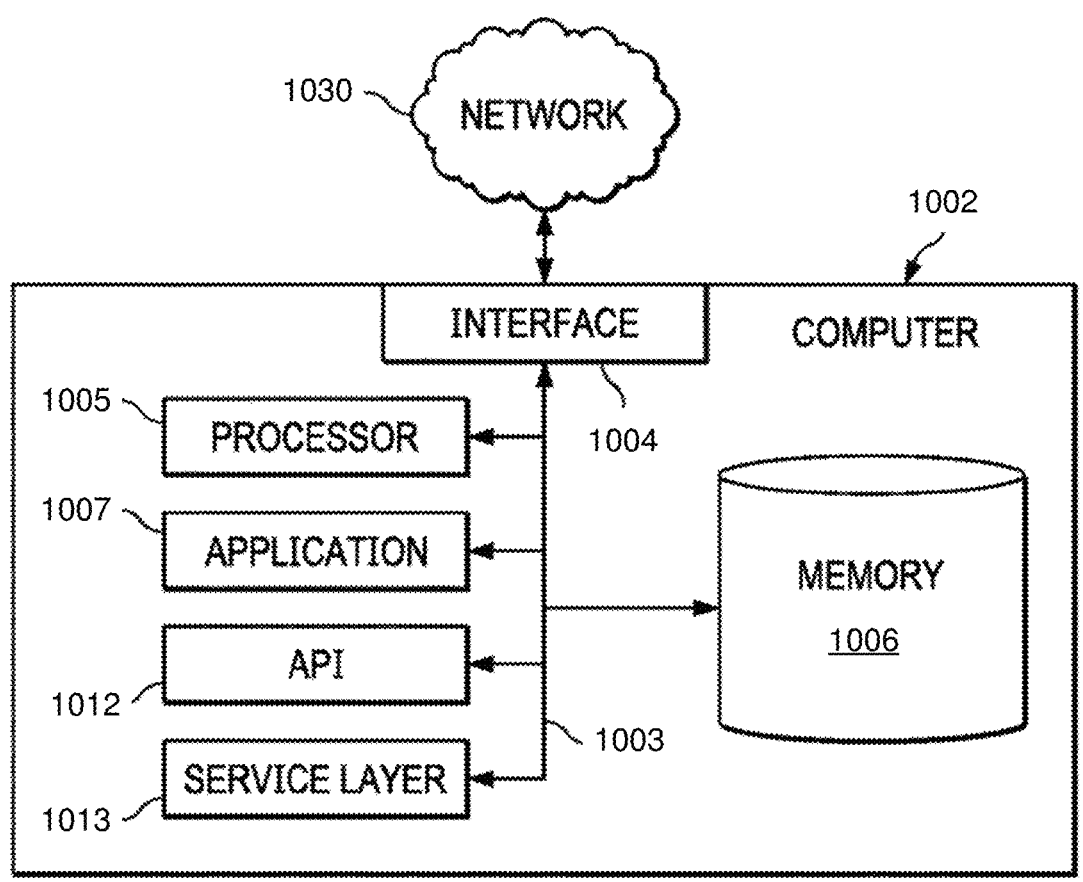
FIG. 10 show a computing system in accordance with one or more embodiments.

Embodiments may be implemented on a computer system. FIG. 10 is a block diagram of a computer system (1002) used to provide computational functionalities associated with described algorithms, methods, functions, processes, flows, and procedures as described in the instant disclosure, according to an implementation. The illustrated computer (1002) is intended to encompass any computing device such as a high performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (1002) may include a computer that includes an input device, such as a keypad, keyboard, touch screen, or other device that can accept user information, and an output device that conveys information associated with the operation of the computer (1002), including digital data, visual, or audio information (or a combination of information), or a GUI.

The computer (1002) can serve in a role as a client, network component, a server, a database or other persistency, or any other component (or a combination of roles) of a computer system for performing the subject matter described in the instant disclosure. The illustrated computer (1002) is communicably coupled with a network (1030). In some implementations, one or more components of the computer (1002) may be configured to operate within environments, including cloud-computing-based, local, global, or other environment (or a combination of environments).

At a high level, the computer (1002) is an electronic computing device operable to receive, transmit, process, store, or manage data and information associated with the described subject matter. According to some implementations, the computer (1002) may also include or be communicably coupled with an application server, e-mail server, web server, caching server, streaming data server, business intelligence (BI) server, or other server (or a combination of servers).

The computer (1002) can receive requests over network (1030) from a client application (for example, executing on another computer (1002)) and responding to the received requests by processing the said requests in an appropriate software application. In addition, requests may also be sent to the computer (1002) from internal users (for example, from a command console or by other appropriate access method), external or third-parties, other automated applications, as well as any other appropriate entities, individuals, systems, or computers.

Each of the components of the computer (1002) can communicate using a system bus (1003). In some implementations, any or all of the components of the computer (1002), both hardware or software (or a combination of hardware and software), may interface with each other or the interface (1004) (or a combination of both) over the system bus (1003) using an application programming interface (API) (1012) or a service layer (1013) (or a combination of the API (1012) and service layer (1013). The API (1012) may include specifications for routines, data structures, and object classes. The API (1012) may be either computer-language independent or dependent and refer to a complete interface, a single function, or even a set of APIs. The service layer (1013) provides software services to the computer (1002) or other components (whether or not illustrated) that are communicably coupled to the computer (1002). The functionality of the computer (1002) may be accessible for all service consumers using this service layer. Software services, such as those provided by the service layer (1013), provide reusable, defined business functionalities through a defined interface. For example, the interface may be software written in JAVA, C++, or other suitable language providing data in extensible markup language (XML) format or other suitable format. While illustrated as an integrated component of the computer (1002), alternative implementations may illustrate the API (1012) or the service layer (1013) as stand-alone components in relation to other components of the computer (1002) or other components (whether or not illustrated) that are communicably coupled to the computer (1002). Moreover, any or all parts of the API (1012) or the service layer (1013) may be implemented as child or sub-modules of another software module, enterprise application, or hardware module without departing from the scope of this disclosure.

The computer (1002) includes an interface (1004). Although illustrated as a single interface (1004) in FIG. 10, two or more interfaces (1004) may be used according to particular needs, desires, or particular implementations of the computer (1002). The interface (1004) is used by the computer (1002) for communicating with other systems in a distributed environment that are connected to the network (1030). Generally, the interface (1004 includes logic encoded in software or hardware (or a combination of software and hardware) and operable to communicate with the network (1030). More specifically, the interface (1004) may include software supporting one or more communication protocols associated with communications such that the network (1030) or interface's hardware is operable to communicate physical signals within and outside of the illustrated computer (1002).

The computer (1002) includes at least one computer processor (1005). Although illustrated as a single computer processor (1005) in FIG. 10, two or more processors may be used according to particular needs, desires, or particular implementations of the computer (1002). Generally, the computer processor (1005) executes instructions and manipulates data to perform the operations of the computer (1002) and any algorithms, methods, functions, processes, flows, and procedures as described in the instant disclosure.

The computer (1002) also includes a memory (1006) that holds data for the computer (1002) or other components (or a combination of both) that can be connected to the network (1030). For example, memory (1006) can be a database storing data consistent with this disclosure. Although illustrated as a single memory (1006) in FIG. 10, two or more memories may be used according to particular needs, desires, or particular implementations of the computer (1002) and the described functionality. While memory (1006) is illustrated as an integral component of the computer (1002), in alternative implementations, memory (1006) can be external to the computer (1002).

The application (1007) is an algorithmic software engine providing functionality according to particular needs, desires, or particular implementations of the computer (1002), particularly with respect to functionality described in this disclosure. For example, application (1007) can serve as one or more components, modules, applications, etc. Further, although illustrated as a single application (1007), the application (1007) may be implemented as multiple applications (1007) on the computer (1002). In addition, although illustrated as integral to the computer (1002), in alternative implementations, the application (1007) can be external to the computer (1002).

There may be any number of computers (1002) associated with, or external to, a computer system containing computer (1002), each computer (1002) communicating over network (1030). Further, the term "client," "user," and other appropriate terminology may be used interchangeably as appropriate without departing from the scope of this disclosure. Moreover, this disclosure contemplates that many users may use one computer (1002), or that one user may use multiple computers (1002).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method for minimally invasive deep brain simulation (DBS), comprising:
    obtaining a target location for the DBS;
    obtaining an anatomical model; and
    simulatively determining, for a set of antennas endocranially implanted at first positions and emitting electromagnetic waves differing by a frequency offset, a first envelope signal at the target location, using the anatomical model, wherein the first envelope signal resulting from interference of the electromagnetic waves at the target location has an envelope signal frequency corresponding to the frequency offset.

2. The method of claim 1, further comprising:
simultaneously determining a maximum intensity of the first envelope signal at the target location under consideration of safety constraints for tissue.

3. The method of claim 2, further comprising:
implementing the minimally invasive DBS in a patient using the set of antennas endocranially implanted at the first positions by driving the set of antennas to emit the electromagnetic waves with a power producing no more than the maximum intensity of the first envelope signal at the target location.

4. The method of claim 1, further comprising:
simultaneously determining, for a set of antennas endocranially implanted at second positions and emitting the electromagnetic waves differing by the frequency offset, a second envelope signal at the target location, using the anatomical model.

5. The method of claim 1, wherein the simulatively determining the first envelope waveform comprises an optimization goal of maximum intensity transmission (MIT), thereby maximizing power at the target location.

6. The method of claim 1, wherein the simulatively determining the first envelope waveform comprises an optimization goal of maximum focality transmission (MFT), thereby minimizing power at locations other than the target location.

7. The method of claim 1, wherein the simulatively determining the first envelope waveform comprises frequency-domain Finite Element Methods (FEM) simulations.

8. The method of claim 1, wherein the electromagnetic waves have a frequency in a Gigahertz (GHz) range.

9. The method of claim 1, wherein the frequency offset is 100 Hz.

10. The method of claim 1, wherein the electromagnetic waves differing by the frequency offset have the same amplitude.

11. A system for minimally invasive deep brain simulation (DBS), the system comprising:
a simulation system configured to:
obtain a target location for the DBS;
obtain an anatomical model; and
simulatively determine, for a set of antennas endocranially implanted at first positions and emitting electromagnetic waves differing by a frequency offset, a first envelope signal at the target location, using the anatomical model,
wherein the first envelope signal resulting from interference of the electromagnetic waves at the target location has an envelope signal frequency corresponding to the frequency offset.

12. The system of claim 11, wherein the simulation system is further configured to:
simulatively determine a maximum intensity of the first envelope signal at the target location under consideration of safety constraints for tissue.

13. The system of claim 11, wherein the simulation system is further configured to:
simulatively determine, for a set of antennas endocranially implanted at second positions and emitting the electromagnetic waves differing by the frequency offset, a second envelope signal at the target location, using the anatomical model.

14. The system of claim 1, wherein the simulatively determining the first envelope waveform comprises an optimization goal of maximum intensity transmission (MIT), thereby maximizing power at the target location.

15. The system of claim 11, wherein the simulatively determining the first envelope waveform comprises an optimization goal of maximum focality transmission (MFT), thereby minimizing power at locations other than the target location.

16. The system of claim 11, wherein the simulatively determining the first envelope waveform comprises frequency-domain Finite Element Methods (FEM) simulations.

17. The system of claim 11, wherein the electromagnetic waves have a frequency in a Gigahertz (GHz) range.

18. The system of claim 11, wherein the frequency offset is 100 Hz.

19. The system of claim 11, wherein the electromagnetic waves differing by the frequency offset have the same amplitude.

20. A system for minimally invasive deep brain simulation (DBS), the system comprising:
a stimulation system comprising a set of antennas, configured to be endocranially implanted in a patient, the stimulation system configured to:
drive the set of antennas to emit electromagnetic waves differing by a frequency offset to generate an envelope signal at a target location in the patient,
wherein the envelope signal resulting from interference of the electromagnetic waves at the target location has an envelope signal frequency corresponding to the frequency offset.

* * * * *